United States Patent Office 3,066,215
Patented Nov. 27, 1962

3,066,215
WELDING METHOD AND PRODUCT
Ronald H. Espy, Randallstown, Md., assignor to Armco Steel Corporation, a corporation of Ohio
No Drawing. Filed Nov. 18, 1959, Ser. No. 853,706
6 Claims. (Cl. 219—74)

My invention relates generally to the welding of metals, especially to the welding of the precipitation-hardenable stainless steels, and more particularly, it concerns both a method of welding such metals so as to achieve welds which are ductile and which have substantial freedom from detrimental hot-cracking and to the resulting welded metal.

One of the objects of my invention is to provide a simple and direct method for welding the precipitation-hardenable stainless steels, which method is low in operational cost and certain and predictable in results, giving welds which are free of hot-cracking and, following hardening, display all requisite ductility.

Another object is to produce welded joints in precipitation-hardening stainless steels, particularly in the single-pass fusion welding of relatively thin sections, giving welds which are characterized by freedom from hot-cracking, a substantial uniformity throughout, and following hardening treatment, the possession of requisite ductility under both low temperature and high temperature operation, with a weld which displays structure and composition closely approximating those of the parent metal.

Other objects and advantages in part will be obvious and in part more fully pointed out during the course of the following disclosure.

Accordingly, my invention may be considered as residing in the several component ingredients; in the proportioning and ratios thereof, each to the other; in the mode and manner of employing the same, including the several manipulative, operational and procedural steps; and in the relation of each of the same to and with one or more of the others, the scope of the application of all of which is more fully recited in the claims at the end of this specification.

A further object is the provision of a simple and inexpensive composition for use in the welding operation noted which contributes to the qualities of the weld had without, however, adversely affecting the characteristics of the parent metal.

To permit a more ready understanding of my invention it may be noted at this point in the disclosure that the precipitation-hardenable stainless steels, for example, especially the Armco "17-7PH," the "PH15-7Mo" and the "12-7-6" steels (trade-marks of Armco Steel Corporation, these respectively analyzing about 17% chromium, 7% nickel, 1% aluminum, and remainder iron for the "17-7PH" steel; about 15% chromium, 7% nickel, 1% aluminum, 2% molybdenum, and remainder iron for the "PH15-7Mo"; and about 12% chromium, 7% nickel, 1% aluminum, 6% molybdenum, and remainder iron for the "12-7-6" steel), and the products resulting therefrom, have many advantageous fields of application. Particularly, these steels are found to be useful where there is sought ready workability in the comparatively ductile annealed condition of the metal, without attendant work-hardening in combination with strength of high value in the hardened condition of the metal, especially where substantial absence of directionality is required. In short, stainless steel of the type noted is demanded in many and varying modernday fields. Wing and body panels for high speed jet planes are but typical. These panels conveniently are joined through a welding operation.

Experience reveals, however, that it has been extremely difficult to produce truly satisfactory welds in products formed of the conventional precipitation-hardening stainless steels. Particularly has this been observed when resorting to fusion-welding in the production of various welded joints, laps, seams, etc. For here, hot-cracking is observed in the weld bead. Even more important, it has been found that upon subsequent hardening, through precipitation-hardening treatment, these welds have failed to display requisite ductility; characteristically they are comparatively brittle. A coarse grain structure is observed under the microscope.

In the prior art resort has been made to modification of the composition by employing filler wire of special composition. Such efforts have proved unsatisfactory, however, and hence have been discarded. One disadvantage lay in the dilution brought about the filler wire in the weld metal. It was found that this varied not only with the gauge of the metal undergoing treatment, but as well, with the welding technique employed. Thus, where appreciable quantities of filler rod were employed, many grades and compositions of necessity had to be produced and stocked. As a practical matter, however, fusion-welding is frequently conducted in substantial absence of filler rod. Occasionally an intermediate condition exists; but little filler rod is employed in the welding practice. In these latter instances, the composition of the weld is dictated in large measure by the composition of the parent metal; little metal is supplied by a filler.

For obvious reasons, it is not feasible to vary the composition of the parent metal from use to use in order to weld the metal. Typically, a steel suited to such purposes in all probability would be too highly austenitic when in wrought condition.

And, for a variety of reasons, other practices heretofore proposed have proved to be too costly, too complicated, too critical, or too uncertain. The range of compositions of parent metal which can be operated upon by suggested proposals has proved too narrow, too critical or too limited to be commercially feasible or practicable, when measured by the pressures of present-day industrial competition.

Accordingly, an object of my invention is to provide a method and means for favorably modifying the weld composition of metal, especially the steels, and more particularly the precipitation-hardenable stainless steels, in simple, direct, certain manner, employing minimum investment of equipment, space and labor, predictably resulting in the production of uniform welds possessing close-grained structure and freedom from hot-cracking, freedom from directionality, and displaying requisite ductility attendant upon subsequent hardening processing, and this under operating conditions of both low temperatures and elevated temperatures.

Referring now more particularly to the practice of my invention I find that in joining sheets of the precipitation-hardening stainless steels, as by welding into panels, and in the production of generally like welded products the difficulties encountered are largely attributable to the fact that the welds are, essentially, castings. Displaying the usual characteristics of cast metal, they tend towards large inclusions of delta-ferrite, with brittle cleavage and coarse-grained structure. They fracture easily. This is in sharp contrast with the parent metal, which typically comprises a wrought product.

Microscopic studies suggest that the unsatisfactory welding qualities of the precipitation-hardening stainless steels of the character noted may be attributed to the presence in the microstructure of the weld metal, of too great a quantity of delta-ferrite. Perhaps this may be attributed to excessive coring during solidification, i.e., in the transition of the weld metal from molten or semi-molten condition to solid state. Where the temperature of the weld falls substantially before final solidification sets in, then large quantities of a ferrite phase appear in the structure. A heterogeneity, attendant upon coring, brings about the production of a much larger amount of delta-ferrite in the region of the weld metal than is found in the parent metal.

Now my invention has particular application to the fusion-welding of the precipitation-hardening stainless steels such as the Armco "17-7PH," "PH15-7Mo" and "12-7-6" steels, wherein the welding arc is shielded through the use of an operating atmosphere which is comprised of a stream of inert gas. Advantageously, and in accordance with the teachings of my invention, I employ the shielding gas as a medium for introducing alloying element in the weld metal in the region of the weld and while such metal is in either a molten or a semi-molten form. The alloying ingredient is nitrogen, although some benefit is had with a carbonaceous gas. Both are supplied in gaseous form. And I find that they favorably modify the composition of the weld metal without detracting from the desired characteristics of the parent stainless steel, either in the as-welded condition or the precipitation-hardened condition.

I find that at elevated temperatures and in semi-molten condition, the metal absorbs both nitrogen and carbon from the stream of otherwise inert shielding gas. Both carbon and nitrogen serve as austenite-formers. As to the carbon additives, however, I encounter certain difficulties. For I find that while carbon serves to control the amount of delta-ferrite formed in the region of the weld, this addition in practice actively combines with the electrode of the welding torch, and rapidly destroys it. In welding with a consumable electrode, however, this is of no moment, but in welding with a tungsten electrode it is.

With nitrogen gas I find that I can achieve nice control of the composition of the weld metal, without serious detriment to the torch electrode, this by varying the characteristics of the shielding atmosphere in which the weld is performed. Thus I have established that I can effectively bring about the required close control of the quantity of nitrogen which is picked up in the weld metal during the welding operation through any one of, or selected combination of, several different expedients. Thus, by one method I closely control the percentage of nitrogen present in the shielding gas. By another I meter the rate or volume of flow of the nitrogen-enriched gas as it flows across the region of the weld. Finally, by a third, I control the speed at which the weld electrode moves across the joint undergoing welding, and vary the current density employed, thereby effectively calibrating the time during which the weld remains in molten or semi-molten condition and during which it is capable of picking up and absorbing the nitrogen additive. Frequently, I correlate all three factors.

As a specific example of the practice of my invention, consider the welding of a conventional "PH15-7Mo" stainless steel, this containing say about 15% chromium, 7% nickel, 2% molybdenum, 1% aluminum, and remainder iron. Here, with a weld produced in thin foil up to plate of say one-half inch thickness, in single pass, and with shielding atmosphere, the weld metal, although possessing requisite strength and hardness qualities, typically is brittle, is subject to hot-cracking, and contains about 40% delta-ferrite. Steel of a lower chromium content, say about 13%, perhaps would give weld metal of a lower delta-ferrite content, as low as about 3%, since the chromium is a ferrite-former. But this mode of ferrite control is both undesirable and impracticable since it is attended by loss of the desirable properties of chromium enrichment in the parent metal.

In accordance with the teachings of my invention, I find that the same desirable reduction in the delta-ferrite content of the weld metal can be realized through the addition of nitrogen to the weld metal in the "PH15-7Mo" steel. Illustratively, I provide a square-butt joint of "PH15-7Mo" steel. In the welding operation I employ a tungsten arc using a tungsten electrode and an inert-gas shield. I introduce into the shielding gas and as a component thereof gaseous nitrogen. For the shielding gas I employ either helium or argon, or a mixture thereof. Preferably I employ helium, since it is far more responsive to the changes in voltage required to maintain the arc, this as a function of change in the length of the arc. With argon, unlike helium, there is little change in the voltage requirement upon change in the length of the arc. And argon, when used alone as the shielding inert atmosphere, is somewhat difficult to use in automatic arc-gap controlled equipment, because of the relative insensitivity of action. Helium permits the use of automatic equipment, and generally is preferred where available. A shortage of helium is predicted because of limited supply and an increase in government demand.

Fortunately, however, I find that the addition of nitrogen to the argon gas in accordance with the teachings of my invention, improves the action of the latter, as regards the voltage requirement upon change in the length of the arc gap; the inclusion of nitrogen in appreciable quantities establishes a steeper relationship between the length of the gap between the electrodes in the region of the weld and the voltage required to maintain an arc discharge across the gap. The use of automatically controlled welding equipment is thereby rendered feasible.

In the practice of my invention I employ nitrogen gas in mixture with the shielding gas, the latter being helium alone, argon alone, or a mixture of the two gases. The amount of nitrogen used is, by volume, from about 10% up to about 50%. With a nitrogen content of less than 10% by volume I find no appreciable suppression of ferrite within the weld metal. Nor is there appreciable improvement in ductility of the weld metal, attending hardening. Conversely, when nitrogen is increased appreciably beyond 50% by volume, there is observed a progressive tendency toward loss of the tungsten electrode employed, a phenomenon which assumes significant proportions with nitrogen present in quantity above about 40%. Thus the permissible range of nitrogen falls between about 10% and about 40%. Where the weld being produced requires very high percentages of nitrogen, as where the steel analysis is initially very low in this element, the use of a consumable electrode is indicated.

I find, as noted above, that within the stream of shielding gas the nitrogen content may range broadly from as low as about 10% up to as high as about 40% by volume, with retention of desirable results. For optimum values, a mixture including 20% nitrogen by volume is indicated. And the rate of flow of the gas mixture usually is on the order of 15 to 30 cubic feet per hour.

The presence of nitrogen in the shielding gas presents no adverse effect upon the welding operation. And this is true, both as to the mechanical prefection of the welds produced, and as to the time requisite to complete the same. In addition, considerable improvement is observed both in the resistance of the weld to hot-cracking, and in the ductility of such weld when in hardened form.

As specifically illustrative of the practice of my invention, I have produced comparative welds using PH15-7Mo stainless steel sheet having a thickness of about 0.06 inch. For the production of the welds I employed a tungsten-arc, inert-gas welding technique. The technique was generally conventional in nature for the production of the test standards. However, in one set of welds, and in accordance with my invention, I employed a shielding gas comprising a mixture of about 10% nitrogen and about 90% helium. In another series of tests, I produced a set of welds according to my invention wherein the shielding gas employed analyzed about 20% nitrogen and about 80% helium. In both series I employed concentric streams of gas to provide the shielding atmosphere for the welding torch. And to this end, I provided an inner core of helium gas, supplying the same at the rate of about 15 cubic feet per hour. I surrounded this inner core with an outer and concentric shielding stream of gas. And this gas annulus was composed of a mixture of helium which I supplied at the rate of 30 cubic feet per hour, along with nitrogen admixed thereto and fed into the annulus at the rate of about 10 cubic feet per hour.

Surprisingly, both welds produced according to my invention covering the new practice, displayed markedly diminished susceptibility to hot-cracking. At the same time, and even more important, substantial increases were observed in the ductility of the weld joint, as shown by increased elongation and lateral contraction before fracture. All the foregoing is evident from consideration of Table I below wherein I disclose comparative test data for the welded PH15–7Mo stainless steel sheet, that is, for welds produced in accordance with the inert-arc method of my invention and that of the prior art, employing a single-pass, fusion-arc process, with tungsten electrode.

TABLE I

*Comparative Mechanical Test Data for Inert-Arc Welded PH15–7Mo Stainless Steel Sheet*

| Shielding-Gas | U.T.S., p.s.i. | 2% Y.S., p.s.i. | Elong., percent in 2″ | Percent Later. Contrac. | Extent Fine Shear Frac. in Weld Metal |
| --- | --- | --- | --- | --- | --- |
| 10% N—90% He | 222,000 | 210,000 | 11 | 5 | 97 |
| 20% N—80% He | 223,000 | 203,000 | 10 | 4 | 98 |
| 100% He | 230,000 | 215,000 | 8 | 1 | 10 |

While the ultimate tensile strength and yield strength was about the same in all three samples it is significant that ductility in terms of the percent elongation and especially the freedom from directionality is substantially greater in the welds according to my invention. And that, also, the grain structure of the weld is very much better in my weld, as gauged by the shear fracture; in the weld of the prior art the coarse grain amounts to about 90% of the cleavage with fine grain only 10%.

As an alternate embodiment of my invention I introduce a carbon-containing gas, notably carbon dioxide, into the shielding gas. But in welding with this gas mixture the vigor and rapidity of the reaction of carbon with the tungsten electrode quickly consumed the latter, although producing a satisfactory weld of refinement and ductility. Where a consumable electrode is purposely employed and where rapid loss of electrode material presents no overwhelming problem, it is my view that a gas mixture including carbon dioxide or other carbon-containing gas in the amount of about 10% to 40% by volume can be used. An admixture of nitrogen and carbon dioxide with the shielding gas produces no meritorious effect. Accordingly in the practice of my invention with tungsten arc welding I employ a shielding gas comprising nitrogen together with argon and/or helium, as noted above.

As the nitrogen gas enters the molten weld metal it appears to form some new aluminum-nitride inclusion. Nevertheless, some nitrogen still remains in solid solution as an alloying element. No porosity is observed in the weld. Minute quantities of aluminum-nitride appear to form and exist in relatively stable condition. Nitrogen pick-up from the gas mixture is such that an initial nitrogen content of the precipitation-hardening steel is increased from approximately 0.03% to a final value ranging from about 0.10% to 0.15%.

Thus it will be seen that I provide in my invention a method, composition and product in which the various objects hereinbefore set forth are successfully achieved. While I find that the practice of my invention has general utility in the production of welds in the precipitation-hardening stainless steels, it has particular application to the welding of the "PH15–7Mo" steel. For here, the problem of hot-cracking, with loss of ductility under high temperature operation is most acute. Moreover, the problem remains in "12–7–6" steels. In the "17–7PH" steels, the difficulty appears to be substantially diminished, the quantity of delta-ferrite decreasing. And my invention has particular application to sheet, strip and plate ranging in thickness up to about 0.06″ maximum. For here, adequate welding can be achieved in a single pass. With plates of greater thickness, requiring multiple passes, practical difficulties are encountered. This I find is demonstrated by decomposition of the aluminum-nitride which appears to be present and a tendency of the weld metal toward some gasiness. The value of my practice in the heavier gauges substantially diminishes. Thus, in summary, my invention has particular application to light-gauge, single-pass welds, in the precipitation-hardenable steels.

While flow of gas has been indicated as ranging between about 15 cubic feet per hour and 30 cubic feet per hour, this range may be extended up to as high as about 100 cubic feet per hour with entirely satisfactory results. I prefer to supply the stream of shielding gas through an orifice of approximately one-half inch diameter. Welding speed can be varied down to as low as about 5 inches per minute. Finally, in welding, I prefer to employ a direct current arc with straight polarity. Where a mixture of argon and helium gas is sought as the shielding atmosphere, these gases preferably are maintained in separate tanks, along with the nitrogen in still a third tank, the gases being intermixed through a suitable mixing valve.

The weld of my invention is of low delta ferrite content, as contrasted with known welds of precipitation-hardening stainless steels. The weld metal closely approximates, in microstructure and in chemical composition, the parent metal. The weld metal tests to approximately the same values of strength and ductility, as does the parent metal. The shear fracture displays a close-grained structure. Welded panels can be produced according to my invention having the same strength throughout their entire extent.

All the foregoing, as well as many other highly practical advantages attend the practice of my invention.

The foregoing disclosure will suggest many embodiments thereof to those skilled in the art; accordingly, I intend the foregoing description to be considered as simply illustrative, and not as comprising limitations.

I claim as my invention:

1. In the fusion-welding of precipitation-hardening stainless steels, the method of improving the ductility and grain structure of the weld by controlling the nitrogen content in the weld metal to a value ranging from about 0.10% to about 0.15% through introducing nitrogen gas into the shielding atmosphere in the amount of 10% to 50% by volume.

2. In single-pass fusion-welding of thin section of precipitation-hardening stainless steels, the method of controlling the nitrogen content of the region of the weld to a final value which is within the approximate range of about 0.10% to about 0.15%, which comprises washing the region of weld with an atmosphere of inert gases selected from the group consisting of helium and argon, admixed with approximately 10% to 40% by volume of nitrogen gas.

3. In the fusion-welding of the precipitation-hardening stainless steels, the method of controlling the nitrogen content in the region of the weld to required value, comprising shielding the region of the weld with an atmosphere of inert gas containing about 20% by volume of nitrogen gas.

4. The method of producing in the precipitation-hardening stainless steels, a ductile weld of fine microstructure substantially uniform with the parent metal and characterized by substantial freedom from hot-cracking, comprising protecting the region of the weld with an atmosphere of inert gas selected from the group consisting of argon and helium, with a nitrogen content ranging from about 10% to 40% by volume, which said atmosphere is supplied at a rate ranging from about 15 to 30 cubic feet per hour.

5. The method of producing ductile welds, substantially free of hot-cracking, in the precipitation-hardening stainless steels containing aluminum, comprising conducting the welding operation in a shielding atmosphere of inert gas containing about 10% to 50% by volume of nitrogen, and passing some of the nitrogen out of the shielding atmosphere into the metal, both in combination with some of the aluminum as an aluminum nitride inclusion and in solid solution with the weld metal in the region of the weld.

6. In the fusion-welding of stainless steel essentially consisting of about 15% chromium, 7% nickel, 1% aluminum, 2% molybdenum, and remainder substantially all iron, the method of supplying a nitrogen content in the region of the weld to an ultimate value ranging from 0.10% to about 0.15%, comprising shielding the arc with a stream of inert gas selected from the group consisting of helium and argon together with nitrogen gas therein in percentage range from about 20% to about 40% by volume.

References Cited in the file of this patent
UNITED STATES PATENTS

| | | |
|---|---|---|
| 1,746,191 | Devers | Feb. 4, 1930 |
| 2,053,417 | Brace | Sept. 8, 1936 |
| 2,156,298 | Leitner | May 2, 1939 |
| 2,156,306 | Rapatz | May 2, 1939 |
| 2,788,429 | Turner et al. | Apr. 9, 1957 |
| 2,863,981 | Thomas et al. | Dec. 9, 1958 |
| 2,929,912 | Lesnewich | Mar. 22, 1960 |
| 2,939,942 | Scheil | June 7, 1960 |